US011195148B2

(12) United States Patent
Tang et al.

(10) Patent No.: US 11,195,148 B2
(45) Date of Patent: Dec. 7, 2021

(54) UTILIZING MACHINE LEARNING MODELS AND CAPTURED VIDEO OF A VEHICLE TO DETERMINE A VALUATION FOR THE VEHICLE

(71) Applicant: Capital One Services, LLC, McLean, VA (US)

(72) Inventors: Qiaochu Tang, The Colony, TX (US); Jason Hoover, Grapevine, TX (US); Micah Price, Anna, TX (US); Geoffrey Dagley, McKinney, TX (US); Staevan Duckworth, The Colony, TX (US); Stewart Youngblood, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/826,802

(22) Filed: Mar. 23, 2020

(65) Prior Publication Data

US 2021/0295243 A1    Sep. 23, 2021

(51) Int. Cl.

| | |
|---|---|
| *G06Q 30/00* | (2012.01) |
| *G06Q 10/08* | (2012.01) |
| *G06Q 30/02* | (2012.01) |
| *G06Q 40/02* | (2012.01) |
| *G06Q 30/06* | (2012.01) |
| *G06Q 10/10* | (2012.01) |
| *G06N 20/00* | (2019.01) |
| *G06K 9/62* | (2006.01) |

(52) U.S. Cl.
CPC ......... *G06Q 10/087* (2013.01); *G06K 9/6256* (2013.01); *G06K 9/6262* (2013.01); *G06N 20/00* (2019.01); *G06Q 10/10* (2013.01); *G06Q 30/0208* (2013.01); *G06Q 30/0278* (2013.01); *G06Q 30/0611* (2013.01); *G06Q 40/025* (2013.01); *G06K 2209/01* (2013.01)

(58) Field of Classification Search
None
See application file for complete search history.

(56) References Cited

U.S. PATENT DOCUMENTS

2017/0357740 A1*  12/2017  Duggan ................. G06Q 10/04
2018/0096398 A1*   4/2018  Wickett ............ G06Q 30/0269
(Continued)

OTHER PUBLICATIONS

STIC EIC 3600 Search Report dated Mar. 30, 2021 (Year: 2021).*
IP.com Search Strategy dated Mar. 29, 2021 (Year: 2021).*

*Primary Examiner* — Matthew T Sittner
(74) *Attorney, Agent, or Firm* — Harrity & Harrity, LLP

(57) ABSTRACT

A valuation platform may receive, from a user device, video data associated with a vehicle, and may receive a vehicle history report of the vehicle based on a vehicle identification number of the vehicle. The valuation platform may receive, from the user device, feature data associated with the vehicle, and may process the video data, the vehicle history report, and the feature data, with a machine learning model, to determine one or more values for the vehicle. The valuation platform may determine a valuation for the vehicle based on the determined one or more values for the vehicle. The valuation platform may create a vehicle profile for the vehicle based on the video data, the vehicle history report, the feature data, the determined one or more values for the vehicle, and the valuation for the vehicle, and may perform one or more actions based on the vehicle profile.

20 Claims, 13 Drawing Sheets

(56) References Cited

U.S. PATENT DOCUMENTS

2020/0097841 A1\* 3/2020 Petousis ................... G06N 5/04
2020/0104698 A1\* 4/2020 Ladvocat Cintra .... H04N 5/772
2020/0342478 A1\* 10/2020 Dalinina ............ G06Q 30/0623

\* cited by examiner

UTILIZING MACHINE LEARNING MODELS AND CAPTURED VIDEO OF A VEHICLE TO DETERMINE A VALUATION FOR THE VEHICLE

BACKGROUND

Used vehicle pricing reports may provide multiple pricing information. For example, the reports may provide a dealer or retail price that is a price expected to be paid if buying from a licensed new-vehicle or used-vehicle dealer. The reports may provide a dealer trade-in or wholesale price that is a price a buyer may expect to receive from a dealer if trading in a vehicle or a price that a dealer may typically pay for a vehicle at a dealer wholesale auction. The reports may further provide a private-party price that is a price expected to be paid if buying a vehicle from an individual.

SUMMARY

According to some implementations, a method may include receiving, from a user device, video data associated with a vehicle, wherein the video data may identify one or more of an exterior condition of the vehicle or an interior condition of the vehicle. The method may include receiving a vehicle history report of the vehicle based on a vehicle identification number of the vehicle, and receiving, from the user device, feature data associated with the vehicle, wherein the feature data may identify one or more of working features of the vehicle, audio of an operating engine of the vehicle, or treadwear of tires of the vehicle. The method may include processing the video data, the vehicle history report, and the feature data, with a machine learning model, to determine one or more values for the vehicle, and determining a valuation for the vehicle based on the one or more determined values for the vehicle. The method may include creating a vehicle profile for the vehicle based on the video data, the vehicle history report, the feature data, the one or more determined values for the vehicle, and the valuation for the vehicle, and performing one or more actions based on the vehicle profile.

According to some implementations, a device may include one or more memories and one or more processors, communicatively coupled to the one or more memories, to receive, from a user device, video data associated with a vehicle, wherein the video data may identify one or more of an exterior condition of the vehicle or an interior condition of the vehicle, and receive a vehicle history report of the vehicle based on a vehicle identification number of the vehicle. The one or more processors may receive, from the user device, feature data associated with the vehicle, wherein the feature data may identify one or more of working features of the vehicle, audio of an operating engine of the vehicle, or treadwear of tires of the vehicle, and may process the video data, the vehicle history report, and the feature data, with a machine learning model, to determine one or more values for the vehicle. The one or more processors may provide, to a server device, the one or more determined values for the vehicle and a request for a valuation for the vehicle, and may receive, from the server device, the valuation for the vehicle based on the one or more determined values for the vehicle and based on the request. The one or more processors may create a vehicle profile for the vehicle based on the video data, the vehicle history report, the feature data, the one or more determined values for the vehicle, and the valuation for the vehicle, and may perform one or more actions based on the vehicle profile.

According to some implementations, a non-transitory computer-readable medium may store one or more instructions that, when executed by one or more processors of a device, may cause the one or more processors to receive, from a user device, video data associated with a vehicle, wherein the video data may identify one or more of an exterior condition of the vehicle, or an interior condition of the vehicle. The one or more instructions may cause the one or more processors to receive a vehicle history report of the vehicle based on a vehicle identification number of the vehicle, and receive, from the user device, feature data associated with the vehicle, wherein the feature data may identify one or more of working features of the vehicle, audio of an operating engine of the vehicle, or treadwear of tires of the vehicle. The one or more instructions may cause the one or more processors to process the video data, the vehicle history report, and the feature data, with a machine learning model, to determine one or more values for the vehicle, and determine a valuation for the vehicle based on the one or more determined values for the vehicle. The one or more instructions may cause the one or more processors to perform one or more actions based on the valuation for the vehicle, wherein the one or more actions may include one or more of providing the valuation for the vehicle to a plurality of dealerships that provide offers for the vehicle based on the valuation for the vehicle, providing the valuation for the vehicle to a consumer lending platform that calculates terms for a new vehicle based on the valuation for the vehicle, or providing the valuation for the vehicle to a plurality of consumers that provide offers for the vehicle based on the valuation for the vehicle.

DETAILED DESCRIPTION

Figure 1A:
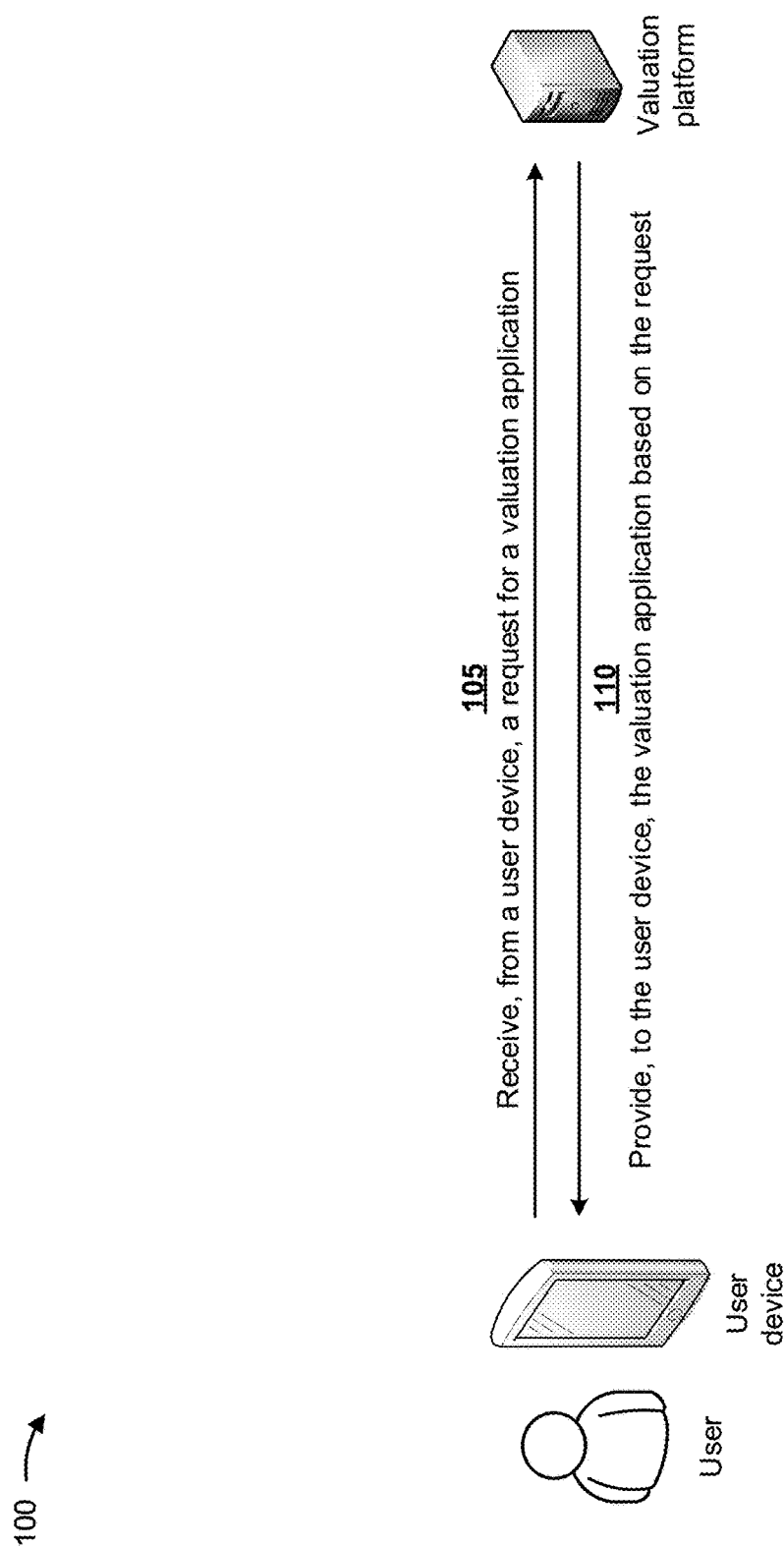
FIGS. 1A-1H are diagrams of one or more example implementations described herein.

The following detailed description of example implementations refers to the accompanying drawings. The same reference numbers in different drawings may identify the same or similar elements.

There are several resources on the Internet that provide inaccurate valuations for vehicles based on basic information, such as year, make, model, mileage, and general condition of the vehicle. Kelley Blue Book offers a service that provides a potentially more accurate vehicle valuation to a customer. However, the service requires the customer to take the vehicle to a dealership for a final inspection and valuation. The final inspection includes determining detailed information about the vehicle, such as an exterior condition, an interior condition, engine condition, and/or the like. Significant resources (e.g., processing resources, memory resources, network resources, transportation resources, and/or the like) of the consumer and the dealership are expended during performance of the final inspection of the vehicle. For example, the consumer must drive the vehicle to the dealership, and the dealership must perform a detailed inspection to determine the detailed vehicle information and must enter and submit the detailed vehicle information to a service such as Kelley Blue Book to obtain the vehicle valuation.

Some implementations described herein provide a valuation platform that utilizes machine learning models and captured video of a vehicle to determine a valuation for the vehicle. For example, the valuation platform may receive, from a user device, video data associated with a vehicle, wherein the video data may identify one or more of an exterior condition of the vehicle or an interior condition of the vehicle. The valuation platform may receive a vehicle history report of the vehicle based on a vehicle identification number of the vehicle, and may receive, from the user device, feature data associated with the vehicle, wherein the feature data may identify one or more of working features of the vehicle, audio of an operating engine of the vehicle, or treadwear of tires of the vehicle. The valuation platform may process the video data, the vehicle history report, and the feature data, with a machine learning model, to determine one or more values for the vehicle, and may determine a valuation for the vehicle based on the one or more determined values for the vehicle. The valuation platform may create a vehicle profile for the vehicle based on the video data, the vehicle history report, the feature data, the one or more determined values for the vehicle, and the valuation for the vehicle, and may perform one or more actions based on the vehicle profile.

In this way, the valuation platform enables a consumer to determine a valuation for a vehicle without wasting additional resources (e.g., processing resources, memory resources, network resources, transportation resources, and/or the like) associated with having a dealership perform a final vehicle inspection. The valuation platform makes determining a valuation for a vehicle less complicated, reduces errors, provides systematic and complete results, and/or the like. Furthermore, the valuation platform enables the consumer to sell the vehicle and/or buy another vehicle (e.g., based on a trade-in of the vehicle) without wasting transportation resources associated with traveling to the dealership, wasting human resources associated with viewing vehicles at the dealership, wasting computing resources associated with performing a transaction with the dealership, and/or the like. For example, computing resources and inspection resources of the dealership may be conserved when the consumer determines the valuation for the vehicle.

FIGS. 1A-1H are diagrams of one or more example implementations 100 described herein. As shown in FIG. 1A, a user device may be associated with a user and a valuation platform. The user may own a vehicle for which the user wishes to determine a valuation. As further shown in FIG. 1A, and by reference number 105, the valuation platform may receive, from the user device, a request for a valuation application. For example, the user device may request a valuation application to be installed on the user device. The valuation application may cause the user device to capture video data and feature data and to provide the video data and the feature data to the valuation platform. In some implementations, the valuation application may enable the user to register a user account with the valuation platform. For example, the valuation application may cause the user device to provide a user interface, and the user may utilize the user interface to establish identification information (e.g., a username, a password, and/or the like), to select options, to define preferences, and/or the like for the account. Thereafter, the user may log into the valuation platform by providing the identification information; may utilize the valuation platform as described below; may update the identification information, the options, and/or the preferences; and/or the like.

As further shown in FIG. 1A, and by reference number 110, the valuation platform may provide, to the user device, the valuation application based on the request. Alternatively, the valuation platform may provide the valuation application (or an invitation to install the valuation application) to the user device based on another event, such as obtaining information from another system (e.g., an online vehicle shopping system, loan application system, and/or the like) that indicates the user may be interested in selling or trading in the vehicle. In some implementations, the valuation platform may maintain and provide the valuation application, as shown. Alternatively, or additionally, the valuation platform or the other system may cause the valuation application to be offered for download from an application distribution platform, such as an application store (e.g., Google Play, Apple App Store, and/or the like), and the user device may receive the valuation application from the application distribution platform. In some implementations, the user device may access the valuation platform via a web browser, a browser-based application, and/or the like.

Figure 1B:
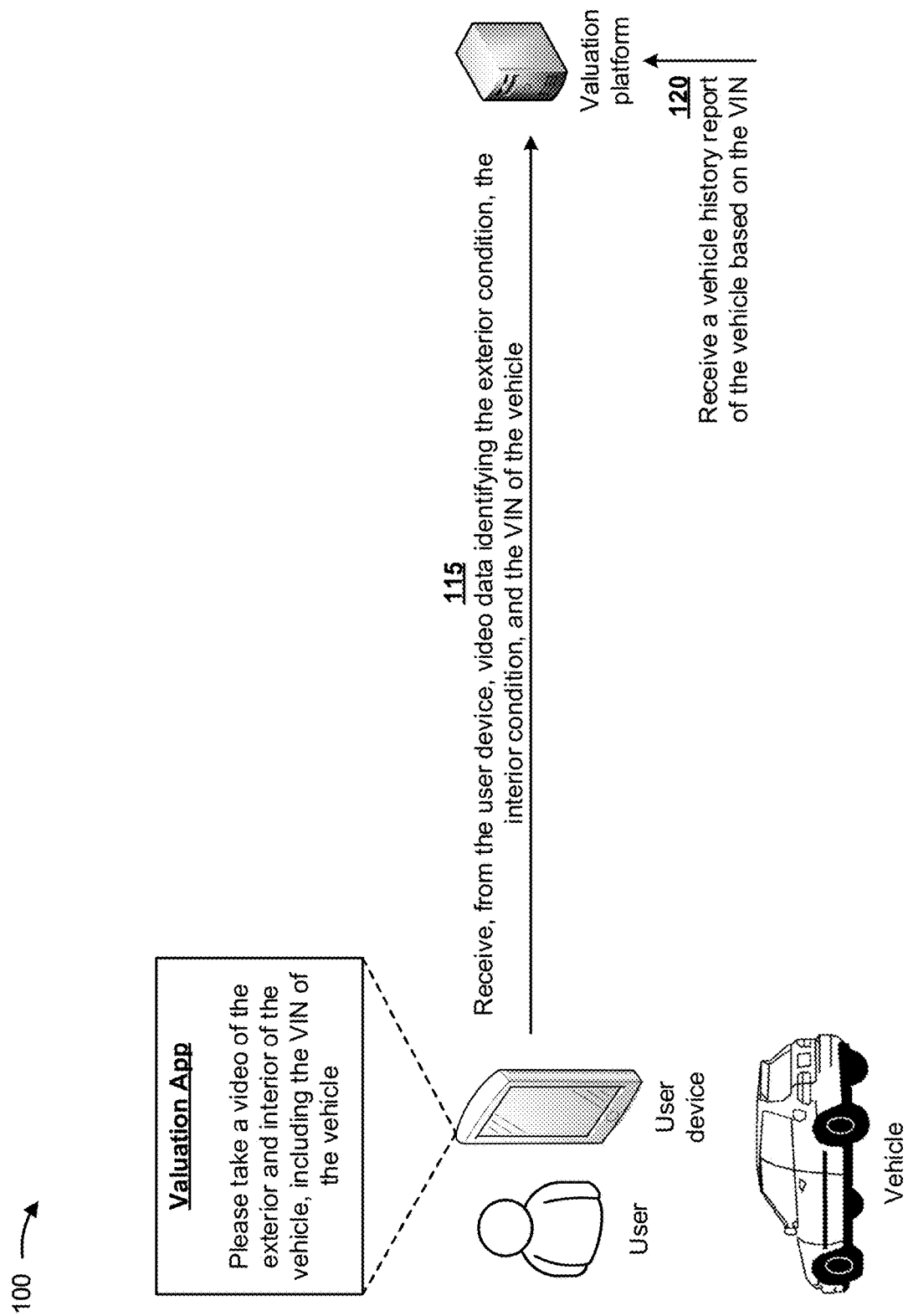

As shown in FIG. 1B, the user and the user device may be associated with a vehicle. As further shown in FIG. 1B, and by reference number 115, the valuation platform may receive, from the user device, video data identifying the exterior condition, the interior condition, the vehicle identification number (VIN) of the vehicle, and/or the like. In some implementations, the valuation application may provide instructions to the user (e.g., capture a video of the exterior of the vehicle, capture a video of the interior of the vehicle, capture an image or a video of the VIN of the vehicle, and/or the like) that cause the user device to capture the video data and to provide the video data to the valuation platform. For example, the valuation platform may lead the user through a series of steps to locate and capture video and/or still images of specified locations of the exterior of the vehicle, the interior of the vehicle, the VIN of the vehicle, and/or the like, from specified angles, from specified distances, with specified settings (e.g., flash), and/or the like. In some implementations, the valuation application may provide augmented reality information that provides the instructions to the user and causes the user device to capture the video data. In some implementations, one or more steps of the series of steps is determined based a vehicle history report of the vehicle. For example, if the vehicle was involved in an accident that damaged a front portion of the vehicle, the series of steps may include requesting the user to capture detailed images of the front portion of the vehicle. In another example, if the vehicle history reports indicates internal vehicle servicing or lack thereof, the series of steps may include requesting the user to capture images or listen to sounds based on the internal vehicle servicing or lack thereof.

In some implementations, the valuation application may cause the user device to communicate with an engine control module, an on-board diagnostics system, and/or the like, of the vehicle to obtain information associated with operating conditions, diagnostics, operational history, mileage, fuel consumption, and/or the like, of the vehicle. The valuation application may provide such information to the valuation platform, may process such information to generate new data (e.g., in a format understood by the valuation platform), may provide the new data to the valuation platform, and/or the like.

As further shown in FIG. 1B, and by reference number 120, the valuation platform may receive a vehicle history report of the vehicle based on the VIN. The vehicle history report (e.g., a Carfax report) may include an accident history of the vehicle, a service history of the vehicle, ownership information of the vehicle, warranty information for the vehicle, type of use information (e.g., personal or commercial) for the vehicle, airbag deployment information of the vehicle, mileage rollovers or rollbacks for the vehicle, recalls for the vehicle, and/or the like.

In some implementations, the valuation platform may utilize an optical character recognition (OCR) technique on the video data or a captured image to identify the VIN of the vehicle. Alternatively, the user device may utilize an OCR technique to identify the VIN, and may provide the VIN (e.g., as text data, numerical data, or the like) to the valuation platform. Optical character recognition involves a conversion of images of typed, handwritten, or printed text into machine-encoded text. For example, OCR may be applied to a video frame, a scanned document, a photo of a document, a photo of a scene that includes text, and/or the like, to produce electronic data (e.g., text data). OCR can be used as a form of information entry from printed paper data records (e. g., printed forms, printed tables, printed reports, passport documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

Figure 1C:
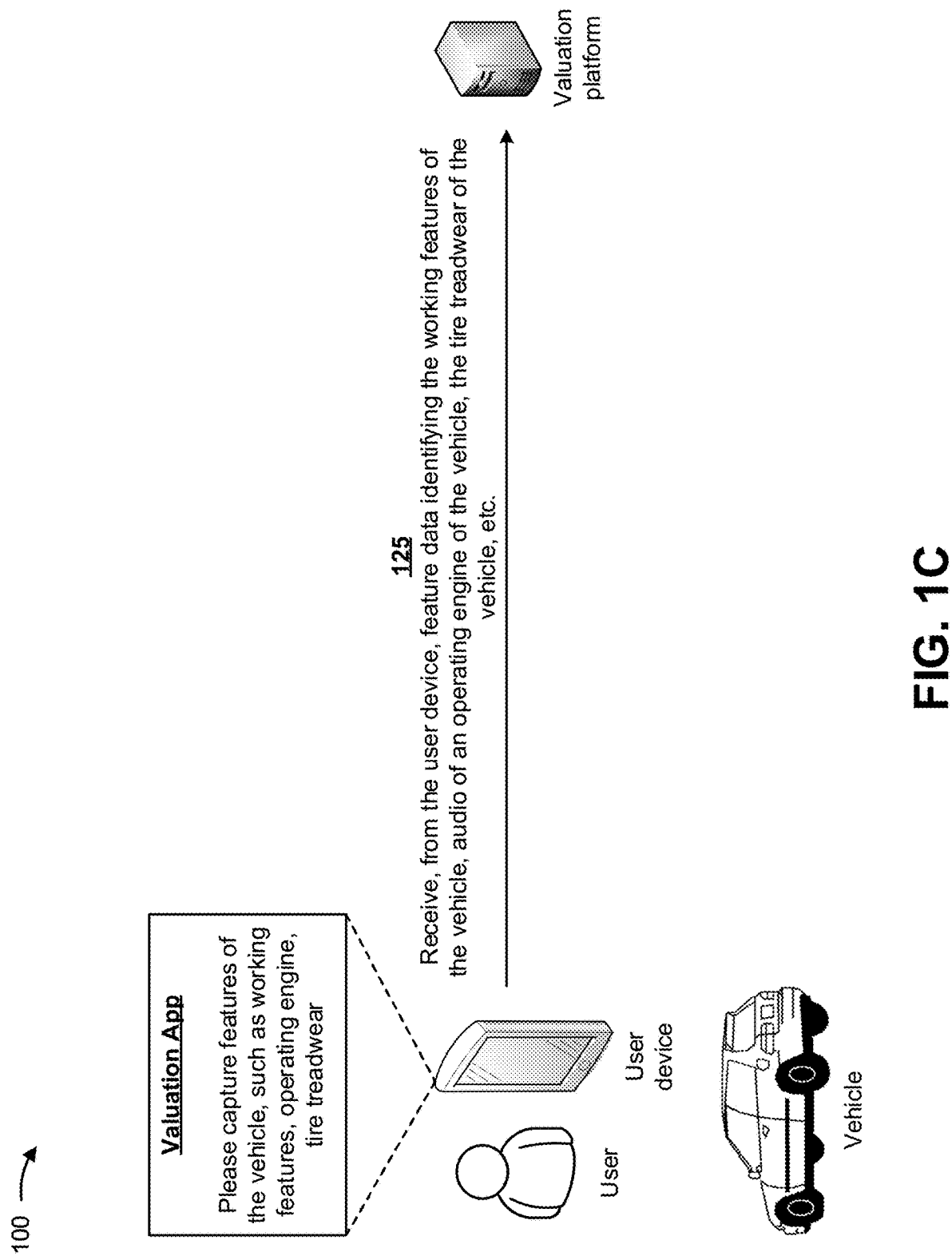

As shown in FIG. 1C, and by reference number 125, the valuation platform may receive, from the user device, feature data identifying working features of the vehicle, audio of an operating engine of the vehicle, tire treadwear of the vehicle, and/or the like. In some implementations, the valuation application may instruct the user to capture features of the vehicle, such as working features of the vehicle (e.g., turn signals, brake lights, headlights, and/or the like), operation of the engine of the vehicle, tire treadwear of tires of the vehicle, and/or the like. For example, the valuation platform may lead the user through a series of steps that instruct the user to capture video of vehicle features in operation (e.g., activating and deactivating turn signals and other lights, turning heat and air conditioning on and off, lowering and raising windows, opening and closing doors, hood, and trunk, and/or the like), to capture audio of vehicle features in operation (e.g., the engine running, a vehicle horn being activated, an entertainment system in operation, and/or the like), to capture images of vehicle features (e.g., each tire of the vehicle showing an amount of tread remaining at specified locations), and/or the like.

In some implementations, the valuation application may cause the user device to communicate with an engine control module, an on-board diagnostics system, and/or the like, of the vehicle to obtain information associated with the working features of the vehicle, such as features available for the vehicle, operability of the features, operating conditions of the engine, operating conditions of the tires, and/or the like. The valuation application may provide such information to the valuation platform, may process such information to generate new data (e.g., in a format understood by the valuation platform), may provide the new data to the valuation platform, and/or the like.

In some implementations, there may be hundreds, thousands, and/or the like, of user devices that produce thousands, millions, billions, and/or the like, of data points provided in the video data and/or the feature data. In this way, the valuation platform may handle thousands, millions, billions, and/or the like, of data points within a period of time (e.g., daily, weekly, monthly), and thus may provide "big data" capability.

Figure 1D:
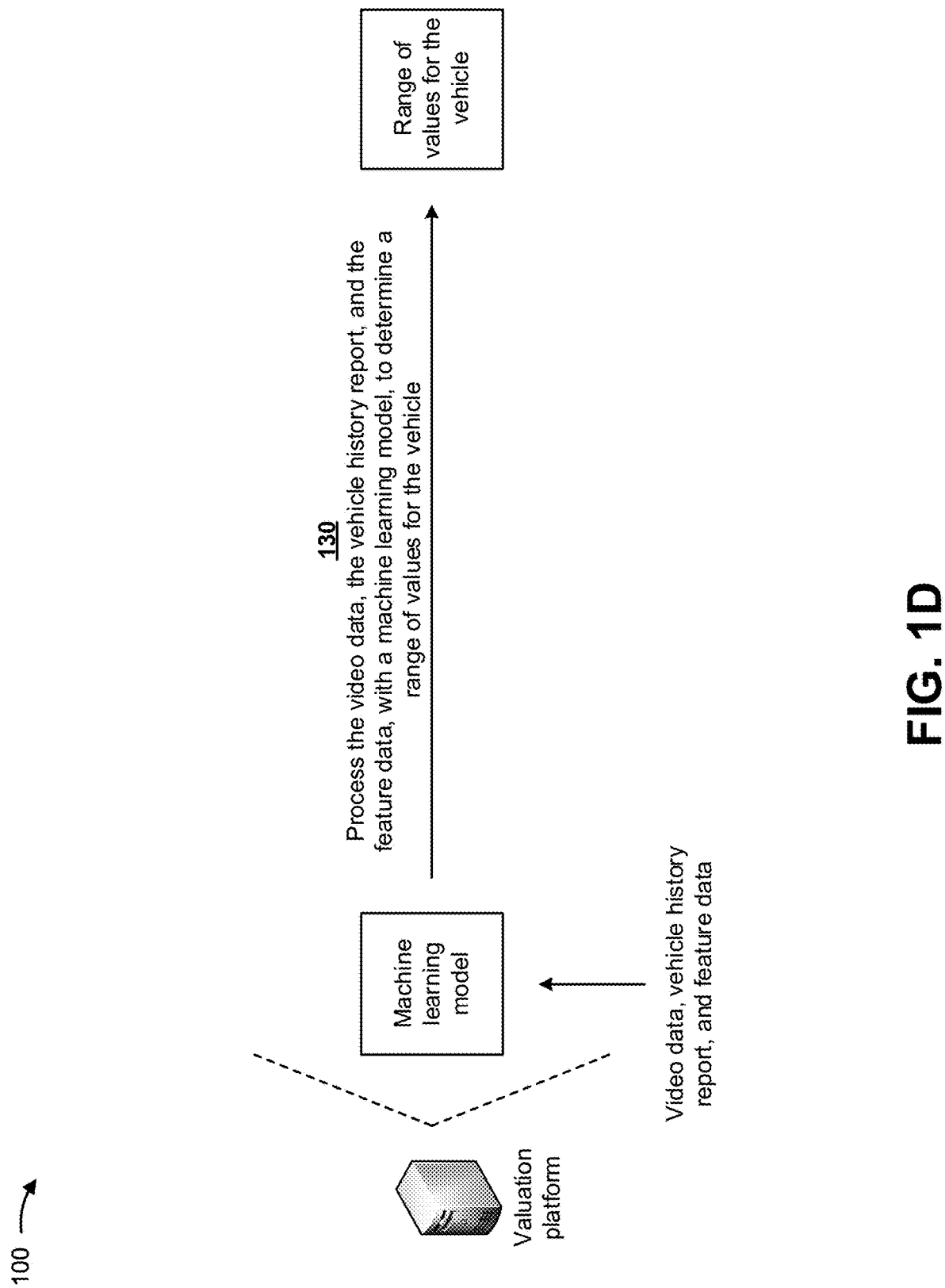

As shown in FIG. 1D, and by reference number 130, the valuation platform may process the video data, the vehicle history report, and the feature data, with a machine learning model, to determine a range of values for the vehicle. The machine learning model may include a neural network classifier model, a long short-term memory (LSTM) model, a reinforcement learning model, and/or the like. In some implementations, the valuation platform may utilize the machine learning model to automatically create a range of values for the vehicle based on the exterior condition of the vehicle, the interior condition of the vehicle, the working features of the vehicle, the operating condition of the engine of the vehicle, the treadwear of the tires of the vehicle, and/or the like. In some implementations, the valuation model may maintain and operate the machine learning models. Additionally, or alternatively, some or all of the machine learning models may be operated and/or maintained by the user device (e.g., as part of the valuation application) and/or by a device (e.g., a server device) that is separate from the user device and the valuation platform.

In some implementations, the valuation platform may process the video data, the vehicle history report, and the feature data, with multiple machine learning models, to determine the range of values for the vehicle. For example, the valuation platform may process video data identifying an exterior of the vehicle, with a first machine learning model, to determine the exterior condition of the vehicle; may process video data identifying an interior of the vehicle, with a second machine learning model, to determine the interior condition of the vehicle; may process feature data identifying features of the vehicle, with a third machine learning model, to determine the working features of the vehicle; may process the feature data identifying the audio of the operating engine of the vehicle, with a fourth machine learning model, to determine an operating condition of the engine of the vehicle; may process feature data identifying the tires of the vehicle, with a fifth machine learning model, to determine the treadwear of the tires of the vehicle; and/or the like. The valuation platform may determine the one or more values for the vehicle based on the exterior condition of the vehicle, the interior condition of the vehicle, the working features of the vehicle, the operating condition of the engine of the vehicle, and the treadwear of the tires of the vehicle determined by the multiple machine learning models.

In some implementations, the machine learning model may be trained, with historical data (e.g., historical video data, historical vehicle history reports, and historical feature data) to determine a predicted range of values. The historical video data, historical vehicle history reports, and historical feature data may be associated with a plurality of vehicles. The historical video data may identify exterior conditions of the plurality of vehicles and interior conditions of the plurality of vehicles. The historical vehicle history reports may identify accident histories, service histories, ownership histories, and/or the like, of the plurality of vehicles. The historical feature data may identify working features of the plurality of vehicles, audio of operating engines of the plurality of vehicles, and treadwear of tires of the plurality of vehicles.

The valuation platform may train the machine learning model by separating the historical data into a training set, a validation set, a test set, and/or the like. The training set may be utilized to train the machine learning model. The validation set may be utilized to validate results of the trained machine learning model. The test set may be utilized to test operation of the machine learning model. In some implementations, the valuation platform may train the machine learning model. Alternatively, the valuation platform may receive the machine learning model from another device that trains the machine learning model.

In some implementations, the valuation platform may train the machine learning model using, for example, an unsupervised training procedure and based on the historical data. For example, the valuation platform may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, the valuation platform may use a logistic regression classification technique to determine a categorical outcome (e.g., vehicle values determined based on the historical data). Additionally, or alternatively, the valuation platform may use a naïve Bayesian classifier technique. In this case, the valuation platform may perform binary recursive partitioning to split the historical data into partitions and/or branches and use the partitions and/or branches to determine outcomes (e.g., vehicle values determined based on the historical data). Based on using recursive partitioning, the valuation platform may reduce utilization of computing resources relative to manual, linear sorting and analysis of data points, thereby enabling use of thousands, millions, or billions of data points to train the machine learning model, which may result in a more accurate model than using fewer data points. Additionally, or alternatively, the valuation platform may use a support vector machine (SVM) classifier technique to generate a non-linear boundary between data points in the training set. In this case, the non-linear boundary is used to classify test data into a particular class.

Additionally, or alternatively, the valuation platform may train the machine learning model using a supervised training procedure that includes receiving input to the machine learning model from a subject matter expert, which may reduce an amount of time, an amount of processing resources, and/or the like to train the machine learning model relative to an unsupervised training procedure.

In some implementations, the valuation platform may use one or more other model training techniques, such as a neural network technique, a latent semantic indexing technique, and/or the like. For example, the valuation platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the valuation platform by being more robust to noisy, imprecise, or incomplete data, and by enabling the valuation platform to detect patterns and/or trends undetectable to human analysts or systems using less complex techniques.

Figure 1E:
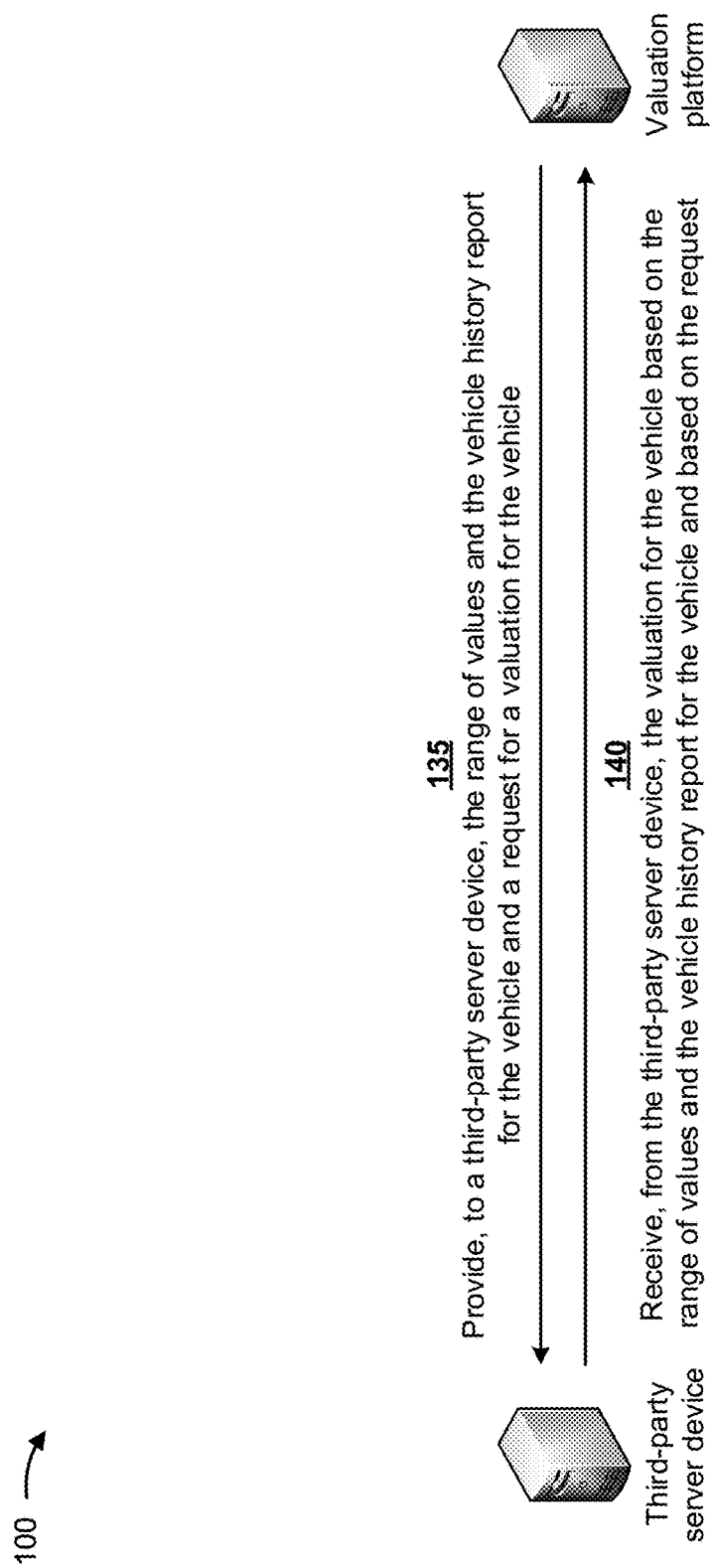

As shown in FIG. 1E, and by reference number 135, the valuation platform may provide, to a third-party server device, the range of values and the vehicle history report for the vehicle and a request for a valuation for the vehicle. For example, the valuation platform may provide the range of values and the vehicle history report to a third party server device associated with Kelley Blue Book, NADA Guide, Black Book, and/or the like. As further shown in FIG. 1E, and by reference number 140, the valuation platform may receive, from the third-party server device, the valuation for the vehicle based on the range of values and the vehicle history report for the vehicle and based on the request. Alternatively, the valuation platform may determine the valuation based on the range of values, rather than utilizing a third-party server. For example, the valuation platform can determine the valuation based on an average of the range of values, a weighted average of the range of values, a mean of the range of values, or the like.

In some implementations, the valuation platform may utilize a model that generates a valuation based on a range of values (e.g., without or without relying on a third party) associated with historical sales information. For example, a data structure (e.g., a database, a table, a list, and/or the like) may be associated with the valuation platform, and may store vehicle condition data for a make, a model, and a year of a vehicle (or for a cluster of vehicles vehicles). The data structure may associate various vehicle data to actual values obtained as a trade-in, sold on dealer lot, and/or the like. The data structure may be constantly updated for each user based on actual valuations received by the users.

Figure 1F:
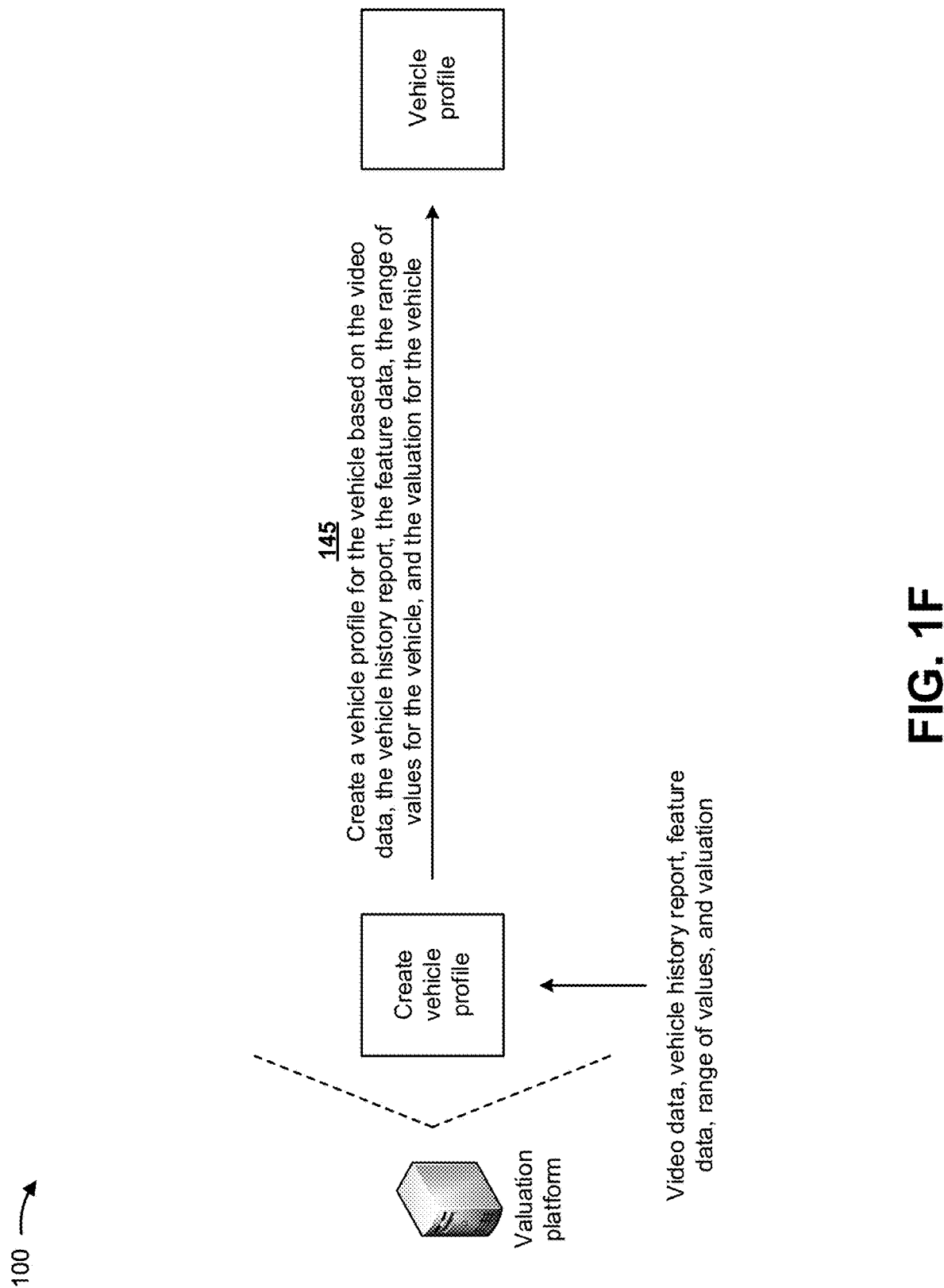

As shown in FIG. 1F, and by reference number 145, the valuation platform may create a vehicle profile for the vehicle based on the video data, the vehicle history report, the feature data, the range of values for the vehicle, and the valuation for the vehicle. The vehicle profile may include information, images, video, audio, and/or the like based on the video data, the vehicle history report, the feature data, the range of values, the valuation, and/or the like. In this way, the valuation platform provides the user, dealerships, lenders, consumers, and/or the like, an accurate determination of the value of the vehicle that may be used to conduct transactions involving the vehicle.

Figure 1G:
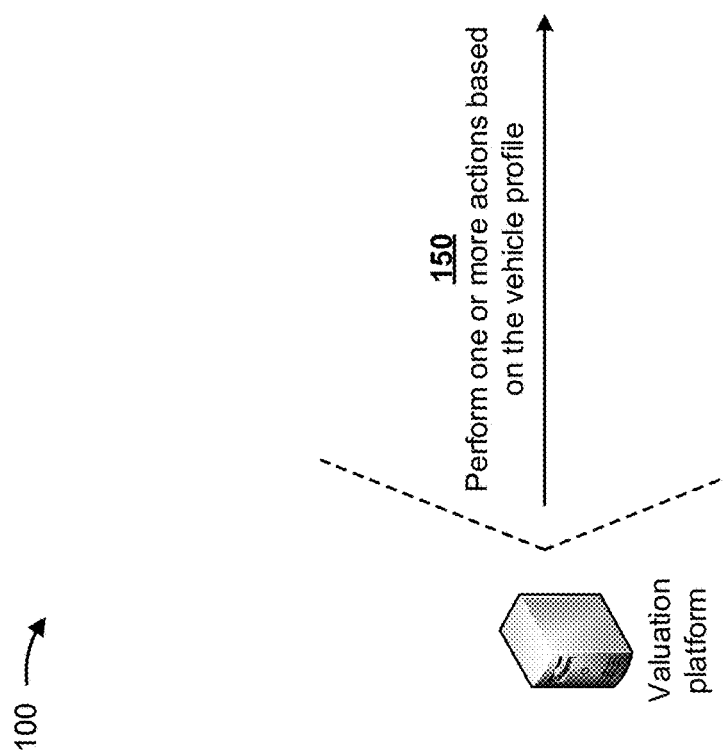

As shown in FIG. 1G, and by reference number 150, the valuation platform may perform one or more actions based on the vehicle profile. The one or more actions may include providing the vehicle profile to a plurality of dealerships that provide offers for the vehicle. For example, the valuation platform may provide the vehicle profile to dealerships to which the user may have an interest in selling the vehicle, to dealerships from which the user may have an interest in buying a new vehicle and trading in the vehicle to reduce a cost of the new vehicle, and/or the like. In this way, dealerships may determine a purchase price or trade-in value more accurately, without requiring the vehicle to be taken to the dealership, which may improve speed and efficiency of the dealership transaction process, and may conserve computing resources (e.g., processing resources, memory resources, and/or the like), transportation resources, and/or the like.

The one or more actions may include providing the vehicle profile to a consumer lending platform that calculates terms of a loan for new vehicle. For example, the valuation platform may provide the vehicle profile to a consumer lending platform associated with one or more lenders from whom the user may borrow money (e.g., to finance a purchase of a new vehicle, using the vehicle as a trade-in, or to finance another purchase for which the vehicle may be used as collateral). The lenders may determine loan terms they are willing to offer to the user to finance the purchase based on the vehicle profile, based on the vehicle profile combined with additional information (e.g., user information such as credit history, employment history, and/or the like), and/or the like. In this way, lenders may determine loan terms more accurately with the accurate valuation, which may improve speed and efficiency of the loan process and conserve computing resources, network resources, and/or the like. Furthermore, lenders may determine the loan terms without waiting for vehicle information to be provided by a dealership, which may allow the user to ensure and/or secure financing before the purchase.

The one or more actions may include providing the vehicle profile to a plurality of consumers that provide offers for the vehicle. For example, the valuation platform may provide the vehicle profile directly to potential buyers of the vehicle, to an auction house that may purchase the vehicle, and/or the like. In this way, the user and consumers may determine a purchase price more accurately than would be possible without an accurate valuation, and without taking the vehicle to a third party to obtain a valuation. This may save the user and consumers money, improve speed and efficiency of the sale process, and conserve computing resources, network resources, and/or transportation resources.

The one or more actions may include providing the vehicle profile, for display, to the user device of the user. In this way, the user may assess a potential result associated with selling the vehicle to a dealership or a consumer, trading in the vehicle, obtaining financing based on the value of the vehicle, and/or the like, more quickly and privately than if the information were required to be obtained from another party, and more accurately than would be possible without an accurate valuation and/or comprehensive vehicle profile.

The one or more actions may include determining instructions to capture additional video data and/or feature data based on the vehicle profile. For example, the valuation platform may determine that information is missing from the vehicle profile, and may provide instructions to capture additional vehicle information that may improve the accuracy of the vehicle profile and/or the valuation of the vehicle. In this way, the valuation platform may automatically provide for a more accurate sales price or trade-in value, more accurate loan terms, and/or the like, which may remove human subjectivity and waste from the process and may improve speed and efficiency of the process.

The one or more actions may include providing, to the user device, the instructions to capture the additional video data and/or feature data based on the vehicle profile. For example, the valuation platform may cause the valuation application on the user device to provide instructions to the user to capture additional video data, audio data, or image data of the vehicle at specified locations. In this way, the valuation platform may provide a more thorough vehicle profile, allowing for more accurate valuation and/or more successful decisions by participants in transactions associated with the vehicle.

The one or more actions may include retraining the machine learning model based on the vehicle profile. In this way, the valuation platform may improve the accuracy of the machine learning model in determining a range of values, which may improve speed and efficiency of the machine learning model and conserve computing resources, network resources, and/or the like.

Figure 1H:
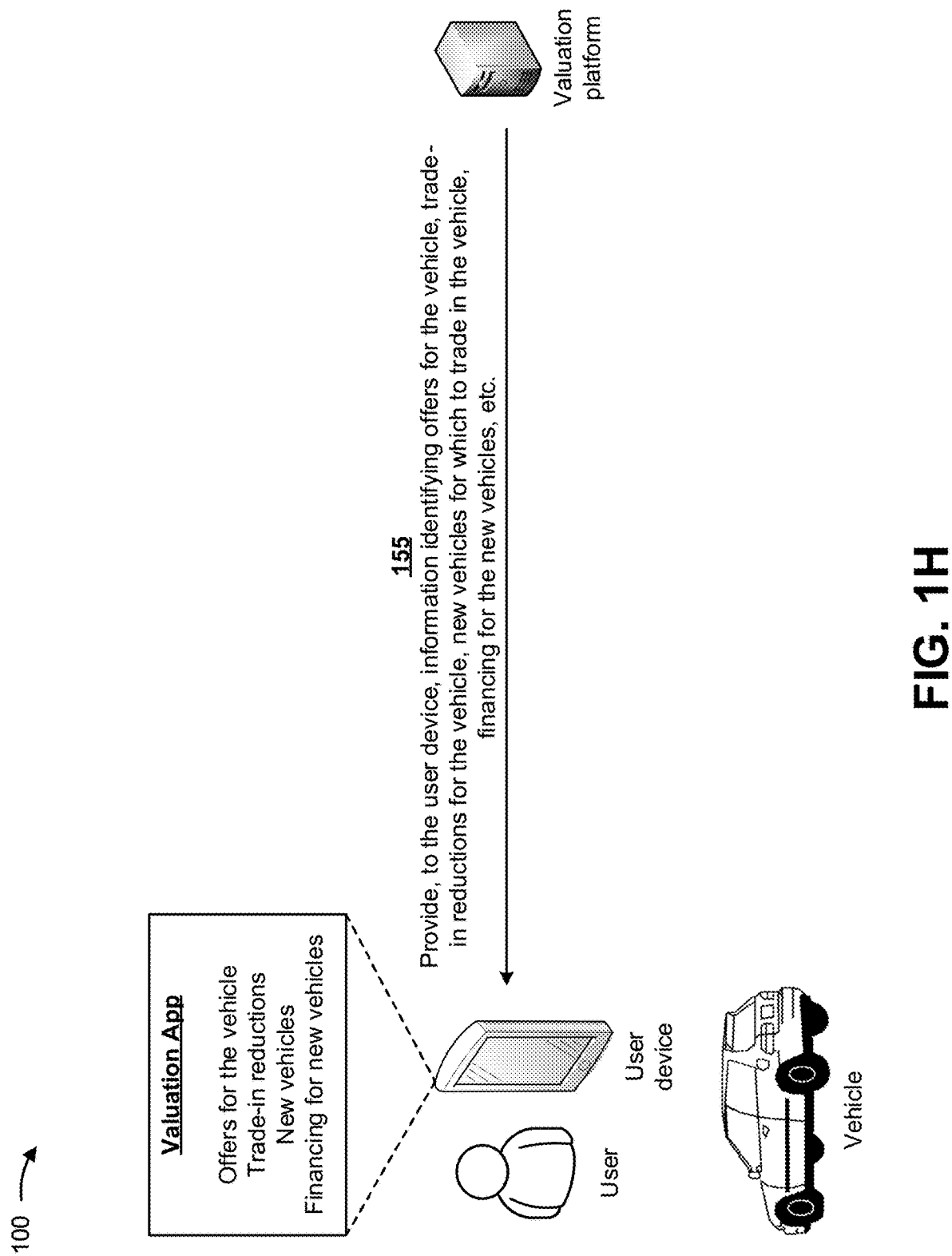

As shown in FIG. 1H, and by reference number 155, the valuation platform may provide, to the user device, information identifying offers for the vehicle, trade-in reductions for the vehicle, new vehicles for which to trade in the vehicle, financing for the new vehicles, and/or the like. For example, the valuation platform may identify the offers, trade-in reductions, new vehicles, and/or financing based on the vehicle profile, and may provide the information to the user device for the valuation application to provide for display to the user via a user interface.

In some implementations, the valuation platform may receive one or more offers for the vehicle from dealerships based on the valuation for the vehicle, and may provide, to the user device, information identifying the one or more offers for the vehicle. The valuation platform may receive, from the user device, a selection of a particular offer, from the one or more offers, that is associated with a particular dealership, and may connect, based on the selection, the user device with a user device associated with the particular dealership. In this way, the user may efficiently compare dealership offers, based on the offers combined with other factors such as location of the dealership, reputation of the dealership, and/or the like, and may efficiently contact and interact with the dealership (e.g., via the valuation application, a telephone call, an email message, a text message, and/or the like).

In some implementations, the valuation platform may receive one or more terms for one or more new vehicles from lenders based on the valuation for the vehicle, and may provide, to the user device, information identifying the one or more terms for the one or more new vehicles. The valuation platform may receive, from the user device, a selection of a particular new vehicle, from the one or more new vehicles, that is associated with a particular consumer lending platform, and may connect, based on the selection, the user device with the particular consumer lending platform or a seller of the vehicle associated with the consumer lending platform. In this way, the user may efficiently compare lenders based on the terms, based on the terms combined with other factors such as reputation of the lender, and/or the like, and may efficiently contact and interact with the lender or seller (e.g., via the valuation application, a telephone call, an email message, a text message, and/or the like).

In some implementations, the valuation platform may receive one or more offers for the vehicle from consumers based on the valuation for the vehicle, and may provide, to the user device, information identifying the one or more offers for the vehicle. The valuation platform may receive, from the user device, a selection of a particular offer, from the one or more offers, that is associated with a particular consumer, and may connect, based on the selection, the user device with a user device associated with the particular consumer. In this way, the user may efficiently compare offers based on the consumers, based on the offers combined with other factors such as location of the consumer, and/or the like, and may efficiently contact and interact with the particular consumer (e.g., via the valuation application, a telephone call, an email message, a text message, and/or the like).

In this way, the valuation platform conserves computing resources, network resources, and/or the like that would otherwise be expended by inefficiently providing the vehicle to the dealership and having the dealership perform a final vehicle inspection to determine the vehicle valuation.

As indicated above, FIGS. 1A-1H are provided merely as examples. Other examples may differ from what is described with regard to FIGS. 1A-1H.

Figure 2:
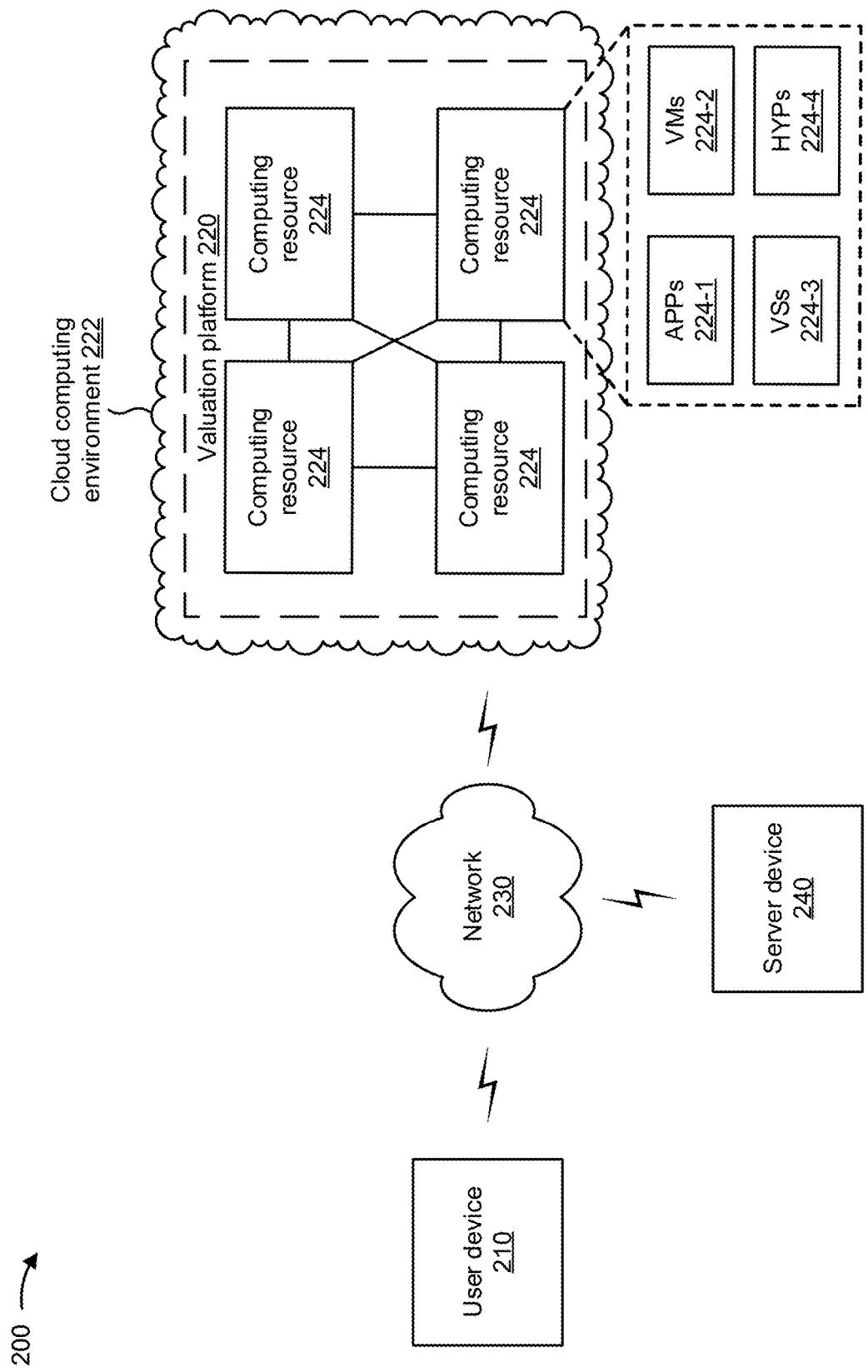
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a valuation platform 220, a network 230, and a server device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a camera, or a similar type of device. In some implementations, user device 210 may receive information from and/or transmit information to valuation platform 220 and/or server device 240.

Valuation platform 220 includes one or more devices that may utilize machine learning models and captured video of a vehicle to determine a valuation for the vehicle. In some implementations, valuation platform 220 may be modular such that certain software components may be swapped in or out depending on a particular need. As such, valuation platform 220 may be easily and/or quickly reconfigured for different uses. In some implementations, valuation platform 220 may receive information from and/or transmit information to one or more user devices 210 and/or server devices 240.

In some implementations, as shown, valuation platform 220 may be hosted in a cloud computing environment 222. Notably, while implementations described herein describe valuation platform 220 as being hosted in cloud computing environment 222, in some implementations, valuation platform 220 may be non-cloud-based (i.e., may be implemented outside of a cloud computing environment) or may be partially cloud-based.

Cloud computing environment 222 includes an environment that may host valuation platform 220. Cloud computing environment 222 may provide computation, software, data access, storage, etc. services that do not require end-user knowledge of a physical location and configuration of system(s) and/or device(s) that host valuation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host valuation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with valuation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of valuation platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with a vehicle valuation service, a financial institution, and/or the like. In some implementations, server device 240 may receive information from and/or transmit information to user device 210 and/or valuation platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
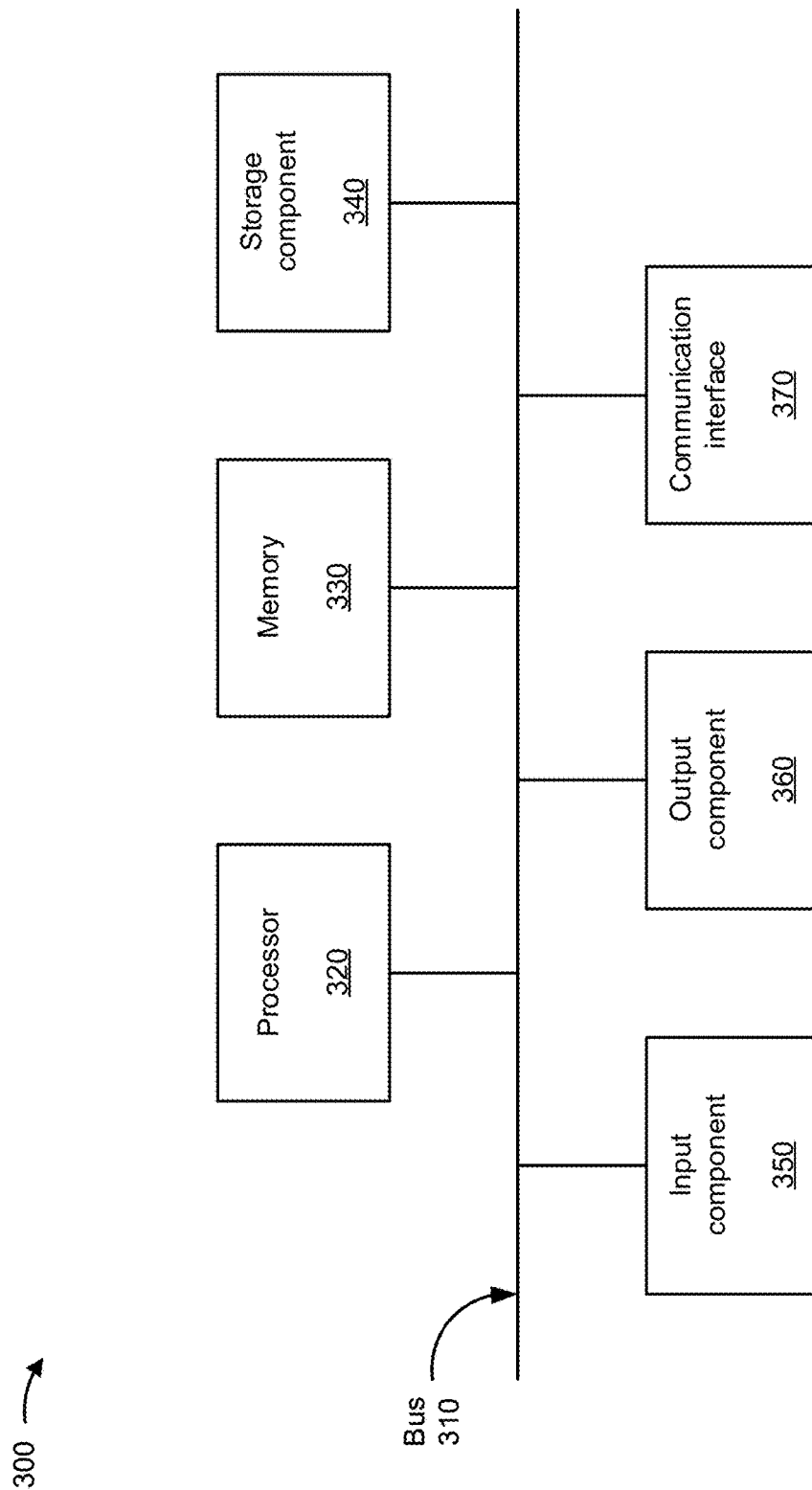
FIG. 3 is a diagram of example components of one or more devices of FIG. 2.

FIG. 3 is a diagram of example components of a device 300. Device 300 may correspond to user device 210, valuation platform 220, computing resource 224, and/or server device 240. In some implementations, user device 210, valuation platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
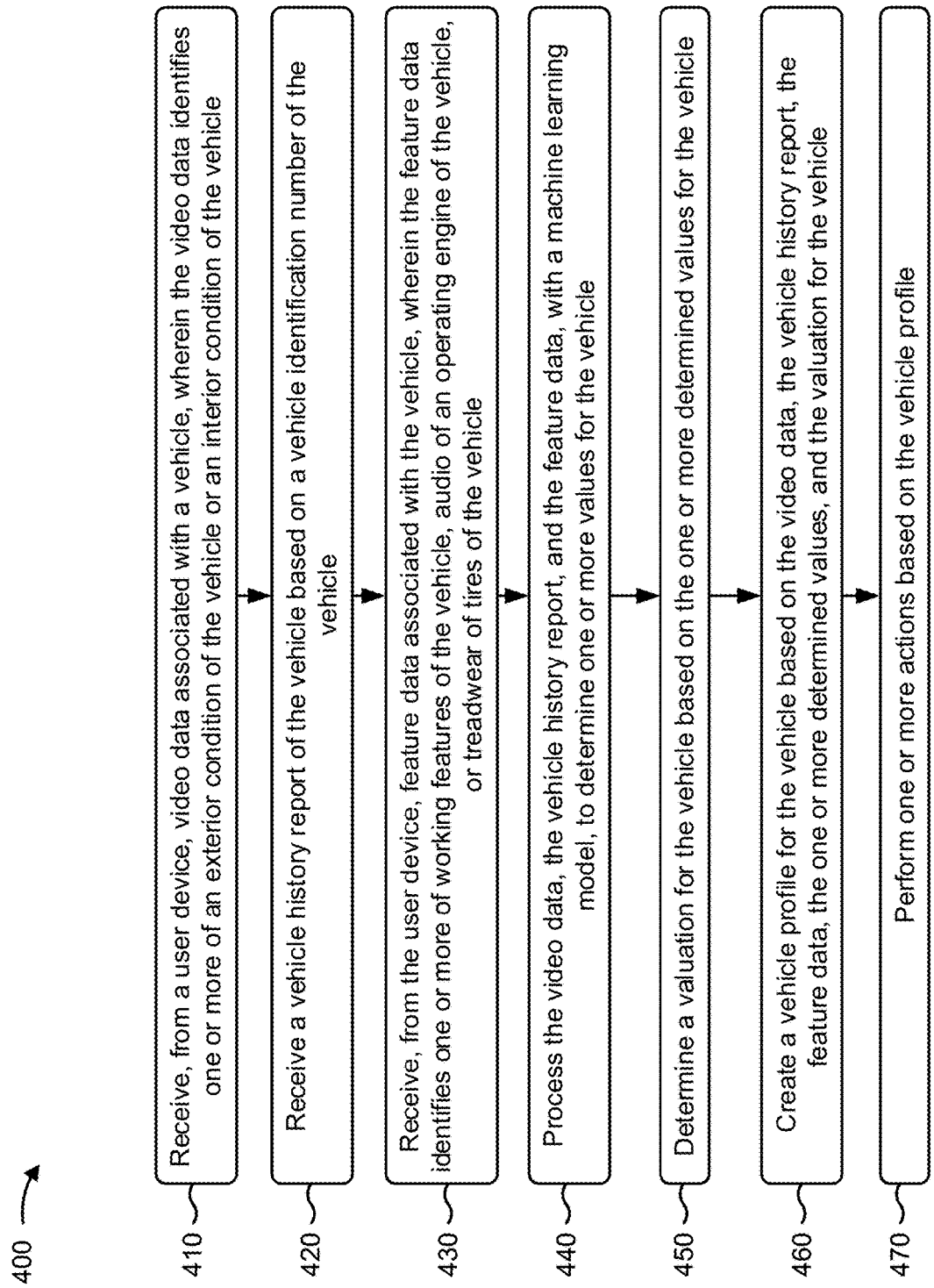
FIGS. 4-6 are flow charts of example processes for utilizing machine learning models and captured video of a vehicle to determine a valuation for the vehicle.

FIG. 4 is a flow chart of an example process 400 for utilizing machine learning models and captured video of a vehicle to determine a valuation for the vehicle. In some implementations, one or more process blocks of FIG. 4 may be performed by a valuation platform (e.g., valuation platform 220). In some implementations, one or more process blocks of FIG. 4 may be performed by another device or a group of devices separate from or including the valuation platform, such as a user device (e.g., user device 210).

As shown in FIG. 4, process 400 may include receiving, from a user device, video data associated with a vehicle, wherein the video data identifies one or more of an exterior condition of the vehicle or an interior condition of the vehicle (block 410). For example, the valuation platform (e.g., using computing resource 224, processor 320, communication interface 370, and/or the like) may receive, from a user device, video data associated with a vehicle, as described above. In some implementations, the video data may identify one or more of an exterior condition of the vehicle or an interior condition of the vehicle.

As further shown in FIG. 4, process 400 may include receiving a vehicle history report of the vehicle based on a vehicle identification number of the vehicle (block 420). For example, the valuation platform (e.g., using computing resource 224, processor 320, communication interface 370, and/or the like) may receive a vehicle history report of the vehicle based on a vehicle identification number of the vehicle, as described above.

As further shown in FIG. 4, process 400 may include receiving, from the user device, feature data associated with the vehicle, wherein the feature data identifies one or more of working features of the vehicle, audio of an operating engine of the vehicle, or treadwear of tires of the vehicle (block 430). For example, the valuation platform (e.g., using computing resource 224, processor 320, communication interface 370, and/or the like) may receive, from the user device, feature data associated with the vehicle, as described above. In some implementations, the feature data may identify one or more of working features of the vehicle, audio of an operating engine of the vehicle, or treadwear of tires of the vehicle.

As further shown in FIG. 4, process 400 may include processing the video data, the vehicle history report, and the feature data, with a machine learning model, to determine one or more values for the vehicle (block 440). For example, the valuation platform (e.g., using computing resource 224, processor 320, memory 330, and/or the like) may process the video data, the vehicle history report, and the feature data, with a machine learning model, to determine one or more values for the vehicle, as described above.

As further shown in FIG. 4, process 400 may include determining a valuation for the vehicle based on the one or more determined values for the vehicle (block 450). For example, the valuation platform (e.g., using computing resource 224, processor 320, storage component 340, and/or the like) may determine a valuation for the vehicle based on the one or more determined values for the vehicle, as described above.

As further shown in FIG. 4, process 400 may include creating a vehicle profile for the vehicle based on the video data, the vehicle history report, the feature data, the one or more determined values for the vehicle, and the valuation for the vehicle (block 460). For example, the valuation platform (e.g., using computing resource 224, processor 320, memory 330, and/or the like) may create a vehicle profile for the vehicle based on the video data, the vehicle history report, the feature data, the one or more determined values for the vehicle, and the valuation for the vehicle, as described above.

As further shown in FIG. 4, process 400 may include performing one or more actions based on the vehicle profile (block 470). For example, the valuation platform (e.g., using computing resource 224, processor 320, memory 330, storage component 340, communication interface 370, and/or the like) may perform one or more actions based on the vehicle profile, as described above.

Process 400 may include additional implementations, such as any single implementation or any combination of implementations described below and/or in connection with one or more other processes described elsewhere herein.

In a first implementation, when determining the valuation for the vehicle, the valuation platform may provide, to a server device, the one or more determined values for the vehicle and a request for the valuation for the vehicle, and may receive, from the server device, the valuation for the vehicle based on the one or more determined values for the vehicle and based on the request.

In a second implementation, alone or in combination with the first implementation, when performing the one or more actions, the valuation platform may provide the vehicle profile to a plurality of dealerships, may provide the vehicle profile to a consumer lending platform, or may provide the vehicle profile to a plurality of consumers.

In a third implementation, alone or in combination with one or more of the first and second implementations, when performing the one or more actions, the valuation platform may provide the vehicle profile, for display, to the user device; may determine instructions to capture additional video data or additional feature data based on the vehicle profile; may provide the instructions to the user device; or may retrain the machine learning model based on the vehicle profile.

In a fourth implementation, alone or in combination with one or more of the first through third implementations, the valuation platform may identify, based on the vehicle profile, one or more of offers for the vehicle, trade-in reductions for the vehicle, a new vehicle for which to trade in the vehicle, or financing for the new vehicle; and may provide, to the user device, information identifying the one or more of the offers for the vehicle, the trade-in reductions for the vehicle, the new vehicle for which to trade in the vehicle, or the financing for the new vehicle.

In a fifth implementation, alone or in combination with one or more of the first through fourth implementations, the valuation platform may receive one or more offers for the vehicle based on the vehicle profile; may provide, to the user device, information identifying the one or more offers for the vehicle; may receive, from the user device, a selection of a particular offer from the one or more offers, wherein the particular offer may be associated with a particular dealership; and may connect, based on the selection, the user device with a user device associated with the particular dealership.

In a sixth implementation, alone or in combination with one or more of the first through fifth implementations, the valuation platform may receive one or more terms for one or more new vehicles based on the vehicle profile; may provide, to the user device, information identifying the one or more terms for the one or more new vehicles; may receive, from the user device, a selection of a particular new vehicle from the one or more new vehicles, wherein the particular new vehicle is associated with a particular consumer lending platform; and may connect, based on the selection, the user device with the particular consumer lending platform.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
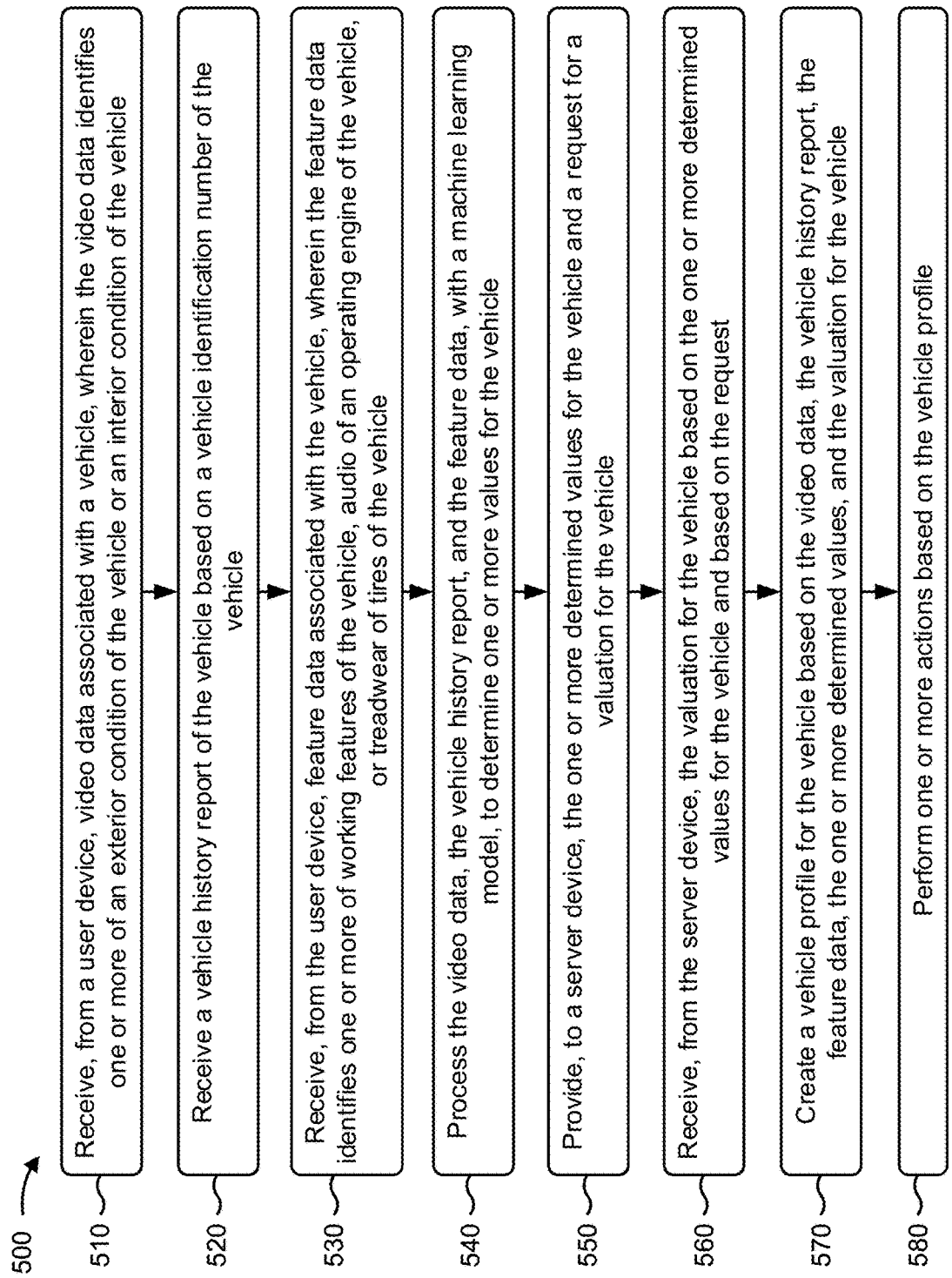

FIG. 5 is a flow chart of an example process 500 for utilizing machine learning models and captured video of a vehicle to determine a valuation for the vehicle. In some implementations, one or more process blocks of FIG. 5 may be performed by a valuation platform (e.g., valuation platform 220). In some implementations, one or more process blocks of FIG. 5 may be performed by another device or a group of devices separate from or including the valuation platform, such as a user device (e.g., user device 210).

As shown in FIG. 5, process 500 may include receiving, from a user device, video data associated with a vehicle, wherein the video data identifies one or more of an exterior condition of the vehicle or an interior condition of the vehicle (block 510). For example, the valuation platform (e.g., using computing resource 224, processor 320, communication interface 370, and/or the like) may receive, from a user device, video data associated with a vehicle, as described above. In some implementations, the video data may identify one or more of an exterior condition of the vehicle or an interior condition of the vehicle.

As further shown in FIG. 5, process 500 may include receiving a vehicle history report of the vehicle based on a vehicle identification number of the vehicle (block 520). For example, the valuation platform (e.g., using computing resource 224, processor 320, communication interface 370, and/or the like) may receive a vehicle history report of the vehicle based on a vehicle identification number of the vehicle, as described above.

As further shown in FIG. 5, process 500 may include receiving, from the user device, feature data associated with the vehicle, wherein the feature data identifies one or more of working features of the vehicle, audio of an operating engine of the vehicle, or treadwear of tires of the vehicle (block 530). For example, the valuation platform (e.g., using computing resource 224, processor 320, communication interface 370, and/or the like) may receive, from the user device, feature data associated with the vehicle, as described above. In some implementations, the feature data may identify one or more of working features of the vehicle, audio of an operating engine of the vehicle, or treadwear of tires of the vehicle.

As further shown in FIG. 5, process 500 may include processing the video data, the vehicle history report, and the feature data, with a machine learning model, to determine one or more values for the vehicle (block 540). For example, the valuation platform (e.g., using computing resource 224, processor 320, memory 330, and/or the like) may process the video data, the vehicle history report, and the feature data, with a machine learning model, to determine one or more values for the vehicle, as described above.

As further shown in FIG. 5, process 500 may include providing, to a server device, the one or more determined values for the vehicle and a request for a valuation for the vehicle (block 550). For example, the valuation platform (e.g., using computing resource 224, processor 320, memory 330, communication interface 370, and/or the like) may provide, to a server device, the one or more determined values for the vehicle and a request for a valuation for the vehicle, as described above.

As further shown in FIG. 5, process 500 may include receiving, from the server device, the valuation for the vehicle based on the one or more determined values for the vehicle and based on the request (block 560). For example, the valuation platform (e.g., using computing resource 224, processor 320, communication interface 370, and/or the like) may receive, from the server device, the valuation for the vehicle based on the one or more determined values for the vehicle and based on the request, as described above.

As further shown in FIG. 5, process 500 may include creating a vehicle profile for the vehicle based on the video data, the vehicle history report, the feature data, the one or more determined values for the vehicle, and the valuation for the vehicle (block 570). For example, the valuation platform (e.g., using computing resource 224, processor 320, storage component 340, and/or the like) may create a vehicle profile for the vehicle based on the video data, the vehicle history report, the feature data, the one or more determined values for the vehicle, and the valuation for the vehicle, as described above.

As further shown in FIG. 5, process 500 may include performing one or more actions based on the vehicle profile (block 580). For example, the valuation platform (e.g., using computing resource 224, processor 320, memory 330, storage component 340, communication interface 370, and/or the like) may perform one or more actions based on the vehicle profile, as described above.

Process 500 may include additional implementations, such as any single implementation or any combination of implementations described below and/or in connection with one or more other processes described elsewhere herein.

In a first implementation, the valuation platform may receive one or more offers for the vehicle based on the vehicle profile; may provide, to the user device, information identifying the one or more offers for the vehicle; may receive, from the user device, a selection of a particular offer from the one or more offers, wherein the particular offer is associated with a particular consumer; and may connect, based on the selection, the user device with a user device associated with the particular consumer.

In a second implementation, alone or in combination with the first implementation, when processing the video data, the vehicle history report, and the feature data, with the machine learning model, to determine the one or more values for the vehicle, the valuation platform may process video data identifying an exterior of the vehicle, with a first machine learning model, to determine the exterior condition of the vehicle; may process video data identifying an interior of the vehicle, with a second machine learning model, to determine the interior condition of the vehicle; may process feature data identifying features of the vehicle, with a third machine learning model, to determine the working features of the vehicle; may process the feature data identifying the audio of the operating engine of the vehicle, with a fourth machine learning model, to determine an operating condition of the engine of the vehicle; may process feature data identifying the tires of the vehicle, with a fifth machine learning model, to determine the treadwear of the tires of the vehicle; and may determine the one or more values for the vehicle based on the exterior condition of the vehicle, the interior condition of the vehicle, the working features of the vehicle, the operating condition of the engine of the vehicle, and the treadwear of the tires of the vehicle.

In a third implementation, alone or in combination with one or more of the first and second implementations, the valuation platform may receive historical video data associated with a plurality of vehicles, wherein the historical video data identifies exterior conditions of the plurality of vehicles and interior conditions of the plurality of vehicles; may receive historical vehicle history reports of the plurality of vehicles; may receive historical feature data associated with the plurality of vehicles, wherein the historical feature data identifies working features of the plurality of vehicles, audio of operating engines of the plurality of vehicles, and treadwear of tires of the plurality of vehicles; and may train the machine learning model, with the historical video data, the historical vehicle history reports, and the historical feature data, to generate a trained machine learning model.

In a fourth implementation, alone or in combination with one or more of the first through third implementations, the valuation platform may receive the vehicle identification number of the vehicle via the video data, and may perform optical character recognition on the video data to identify the vehicle identification number in the video data.

In a fifth implementation, alone or in combination with one or more of the first through fourth implementations, the valuation platform may receive the machine learning model from another device, wherein the machine learning model is trained by the other device based on historical video data, historical vehicle history reports, and historical feature data, wherein the historical video data identifies exterior conditions of a plurality of vehicles and interior conditions of the plurality of vehicles, wherein the historical vehicle history reports are associated with the plurality of vehicles, and wherein the historical feature data identifies working features of the plurality of vehicles, audio of operating engines of the plurality of vehicles, and treadwear of tires of the plurality of vehicles.

In a sixth implementation, alone or in combination with one or more of the first through fifth implementations, the valuation platform may receive, from the user device, a request for a valuation application to be installed on the user device, and may provide the valuation application to the user device based on the request, wherein the valuation application causes the user device to capture and provide the video data and the feature data to the device.

Figure 6:
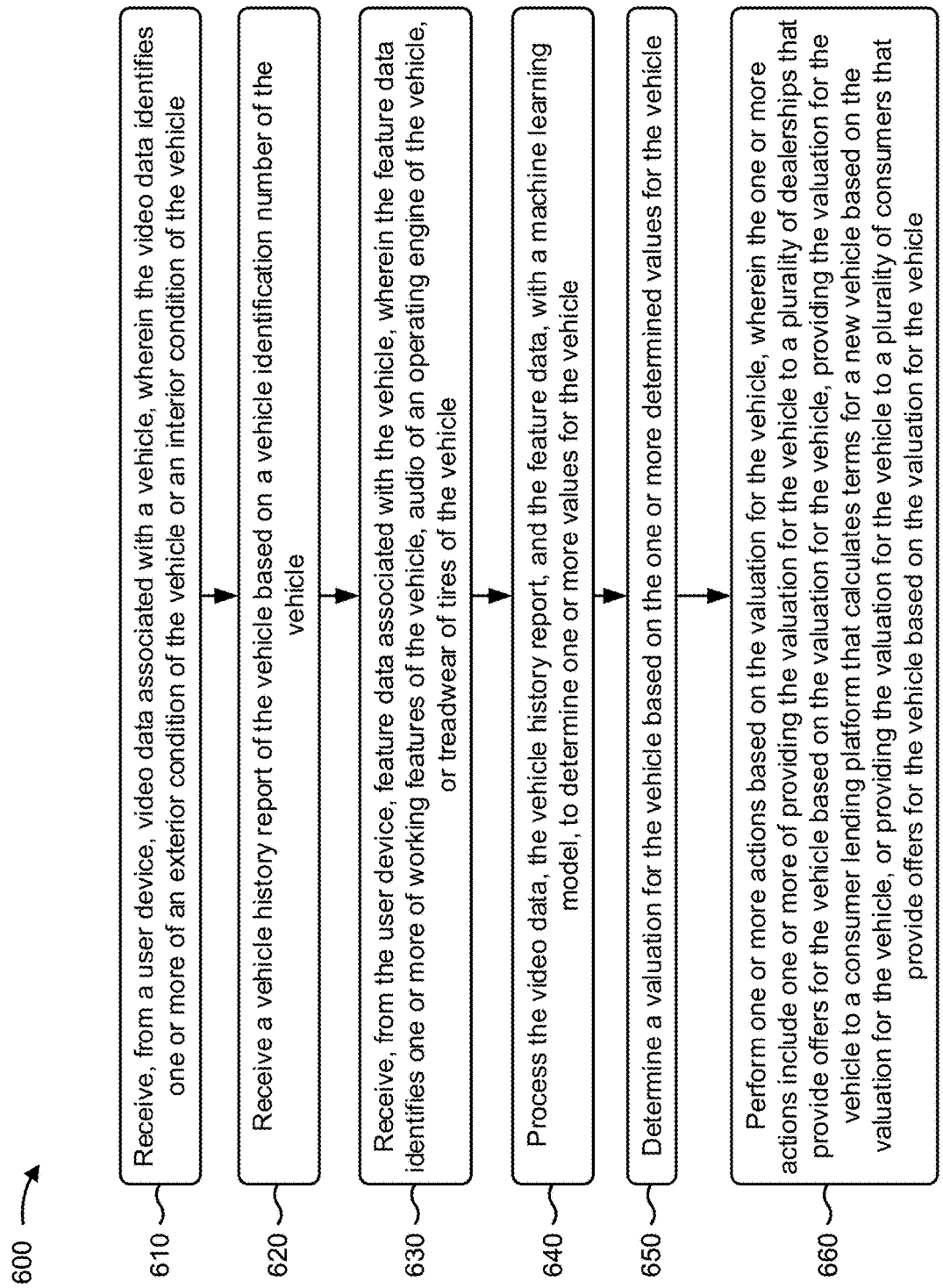

FIG. 6 is a flow chart of an example process 600 for utilizing machine learning models and captured video of a vehicle to determine a valuation for the vehicle. In some implementations, one or more process blocks of FIG. 6 may be performed by a valuation platform (e.g., valuation platform 220). In some implementations, one or more process blocks of FIG. 6 may be performed by another device or a group of devices separate from or including the valuation platform, such as a user device (e.g., user device 210).

As shown in FIG. 6, process 600 may include receiving, from a user device, video data associated with a vehicle, wherein the video data identifies one or more of an exterior condition of the vehicle or an interior condition of the vehicle (block 610). For example, the valuation platform (e.g., using computing resource 224, processor 320, communication interface 370, and/or the like) may receive, from a user device, video data associated with a vehicle, as described above. In some implementations, the video data may identify one or more of an exterior condition of the vehicle or an interior condition of the vehicle.

As further shown in FIG. 6, process 600 may include receiving a vehicle history report of the vehicle based on a vehicle identification number of the vehicle (block 620). For example, the valuation platform (e.g., using computing resource 224, processor 320, communication interface 370, and/or the like) may receive a vehicle history report of the vehicle based on a vehicle identification number of the vehicle, as described above.

As further shown in FIG. 6, process 600 may include receiving, from the user device, feature data associated with the vehicle, wherein the feature data identifies one or more of working features of the vehicle, audio of an operating engine of the vehicle, or treadwear of tires of the vehicle (block 630). For example, the valuation platform (e.g., using computing resource 224, processor 320, communication interface 370, and/or the like) may receive, from the user device, feature data associated with the vehicle, as described above. In some implementations, the feature data may identify one or more of working features of the vehicle, audio of an operating engine of the vehicle, or treadwear of tires of the vehicle.

As further shown in FIG. 6, process 600 may include processing the video data, the vehicle history report, and the feature data, with a machine learning model, to determine one or more values for the vehicle (block 640). For example, the valuation platform (e.g., using computing resource 224, processor 320, memory 330, and/or the like) may process the video data, the vehicle history report, and the feature data, with a machine learning model, to determine one or more values for the vehicle, as described above.

As further shown in FIG. 6, process 600 may include determining a valuation for the vehicle based on the one or more determined values for the vehicle (block 650). For example, the valuation platform (e.g., using computing resource 224, processor 320, storage component 340, and/or the like) may determine a valuation for the vehicle based on the one or more determined values for the vehicle, as described above.

As further shown in FIG. 6, process 600 may include performing one or more actions based on the valuation for the vehicle, wherein the one or more actions include one or more of providing the valuation for the vehicle to a plurality of dealerships that provide offers for the vehicle based on the valuation for the vehicle, providing the valuation for the vehicle to a consumer lending platform that calculates terms for a new vehicle based on the valuation for the vehicle, or providing the valuation for the vehicle to a plurality of consumers that provide offers for the vehicle based on the valuation for the vehicle (block 660). For example, the valuation platform (e.g., using computing resource 224, processor 320, memory 330, storage component 340, communication interface 370, and/or the like) may perform one or more actions based on the valuation for the vehicle, as described above. In some implementations, the one or more actions may include one or more of providing the valuation for the vehicle to a plurality of dealerships that provide offers for the vehicle based on the valuation for the vehicle, providing the valuation for the vehicle to a consumer lending platform that calculates terms for a new vehicle based on the valuation for the vehicle, or providing the valuation for the vehicle to a plurality of consumers that provide offers for the vehicle based on the valuation for the vehicle.

Process 600 may include additional implementations, such as any single implementation or any combination of implementations described below and/or in connection with one or more other processes described elsewhere herein.

In a first implementation, the valuation platform may identify, based on the valuation for the vehicle, one or more of offers for the vehicle, trade-in reductions for the vehicle, a new vehicle for which to trade in the vehicle, or financing for the new vehicle; and may provide, to the user device, information identifying the one or more of: the offers for the vehicle, the trade-in reductions for the vehicle, the new vehicle for which to trade in the vehicle, or the financing for the new vehicle.

In a second implementation, alone or in combination with the first implementation, the valuation platform may receive one or more offers for the vehicle based on the valuation for the vehicle; may provide, to the user device, information identifying the one or more offers for the vehicle; may receive, from the user device, a selection of a particular offer from the one or more offers, wherein the particular offer is associated with a particular dealership; and may connect, based on the selection, the user device with a user device associated with the particular dealership.

In a third implementation, alone or in combination with one or more of the first and second implementations, the valuation platform may receive one or more terms for one or more new vehicles based on the valuation for the vehicle; may provide, to the user device, information identifying the one or more terms for the one or more new vehicles; may receive, from the user device, a selection of a particular new vehicle from the one or more new vehicles, wherein the particular new vehicle is associated with a particular consumer lending platform; and may connect, based on the selection, the user device with the particular consumer lending platform.

In a fourth implementation, alone or in combination with one or more of the first through third implementations, the valuation platform may receive one or more offers for the vehicle based on the valuation for the vehicle; may provide, to the user device, information identifying the one or more offers for the vehicle; may receive, from the user device, a selection of a particular offer from the one or more offers, wherein the particular offer is associated with a particular consumer; and may connect, based on the selection, the user device with a user device associated with the particular consumer.

In a fifth implementation, alone or in combination with one or more of the first through fourth implementations, when processing the video data, the vehicle history report, and the feature data, with the machine learning model, to determine the one or more values for the vehicle, the valuation platform may process video data identifying an exterior of the vehicle, with a first machine learning model, to determine the exterior condition of the vehicle; may process video data identifying an interior of the vehicle, with a second machine learning model, to determine the interior condition of the vehicle; may process feature data identifying features of the vehicle, with a third machine learning model, to determine the working features of the vehicle; may process the feature data identifying the audio of the operating engine of the vehicle, with a fourth machine learning model, to determine an operating condition of the engine of the vehicle; may process feature data identifying the tires of the vehicle, with a fifth machine learning model, to determine the treadwear of the tires of the vehicle; and may determine the one or more values for the vehicle based on the exterior condition of the vehicle, the interior condition of the vehicle, the working features of the vehicle, the operating condition of the engine of the vehicle, and the treadwear of the tires of the vehicle.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from a user device, video data associated with a vehicle,
   wherein the video data identifies one or more of:
   an exterior condition of the vehicle, or
   an interior condition of the vehicle;
   receiving, by the device, a vehicle history report of the vehicle based on a vehicle identification number of the vehicle;
   receiving, by the device and from the user device, feature data associated with the vehicle,
   wherein the feature data identifies one or more of:
   audio of an operating engine of the vehicle, or
   treadwear of tires of the vehicle;
   processing, by the device, the video data, the vehicle history report, and the feature data, with a machine learning model, to determine one or more values for the vehicle,
   wherein the machine learning model is trained based on historical video data, historical vehicle history reports, and historical feature data,
   wherein the historical video data identifies:
   historical exterior conditions of a plurality of vehicles, and
   historical interior conditions of the plurality of vehicles,
   wherein the historical vehicle history reports are associated with the plurality of vehicles, and
   wherein the historical feature data identifies:
   historical audio of operating engines of the plurality of vehicles, and
   historical treadwear of tires of the plurality of vehicles;
   determining, by the device, a valuation for the vehicle based on the one or more determined values for the vehicle;
   creating, by the device, a vehicle profile for the vehicle based on the video data, the vehicle history report, the feature data, the one or more determined values for the vehicle, and the valuation for the vehicle; and
   performing, by the device, one or more actions based on the vehicle profile.

2. The method of claim 1, wherein determining the valuation for the vehicle comprises:
providing, to a server device, the one or more determined values for the vehicle and a request for the valuation for the vehicle; and
receiving, from the server device, the valuation for the vehicle based on the one or more determined values for the vehicle and based on the request.

3. The method of claim 1, wherein performing the one or more actions comprises one or more of:
providing the vehicle profile to a plurality of dealerships;
providing the vehicle profile to a consumer lending platform; or
providing the vehicle profile to a plurality of consumers.

4. The method of claim 1, wherein performing the one or more actions comprises one or more of:
providing the vehicle profile, for display, to the user device;
determining instructions to capture additional video data or additional feature data based on the vehicle profile, and providing the instructions to the user device; or
retraining the machine learning model based on the vehicle profile.

5. The method of claim 1, further comprising:
identifying, based on the vehicle profile, one or more of:
offers for the vehicle,
trade-in reductions for the vehicle,
a new vehicle for which to trade in the vehicle, or
financing for the new vehicle; and
providing, to the user device, information identifying the one or more of:
the offers for the vehicle,
the trade-in reductions for the vehicle,
the new vehicle for which to trade in the vehicle, or
the financing for the new vehicle.

6. The method of claim 1, further comprising:
receiving one or more offers for the vehicle based on the vehicle profile;
providing, to the user device, information identifying the one or more offers for the vehicle;
receiving, from the user device, a selection of a particular offer from the one or more offers,
wherein the particular offer is associated with a particular dealership; and
connecting, based on the selection, the user device with a user device associated with the particular dealership.

7. The method of claim 1, further comprising:
receiving one or more terms for one or more new vehicles based on the vehicle profile;
providing, to the user device, information identifying the one or more terms for the one or more new vehicles;
receiving, from the user device, a selection of a particular new vehicle from the one or more new vehicles,
wherein the particular new vehicle is associated with a particular consumer lending platform; and
connecting, based on the selection, the user device with the particular consumer lending platform.

8. A device, comprising:
one or more memories; and
one or more processors communicatively coupled to the one or more memories, configured to:
receive, from a user device, video data associated with a vehicle,
wherein the video data identifies one or more of:
an exterior condition of the vehicle, or
an interior condition of the vehicle;
receive a vehicle history report of the vehicle based on a vehicle identification number of the vehicle;
receive, from the user device, feature data associated with the vehicle,
wherein the feature data identifies one or more of:
audio of an operating engine of the vehicle, or
treadwear of tires of the vehicle;
process the video data, the vehicle history report, and the feature data, with a machine learning model, to determine one or more values for the vehicle,
wherein the machine learning model is trained based on historical video data, historical vehicle history reports, and historical feature data,
wherein the historical video data identifies:
historical exterior conditions of a plurality of vehicles, and
historical interior conditions of the plurality of vehicles,
wherein the historical vehicle history reports are associated with the plurality of vehicles, and
wherein the historical feature data identifies:
historical audio of operating engines of the plurality of vehicles, and
historical treadwear of tires of the plurality of vehicles;
provide, to a server device, the one or more determined values for the vehicle and a request for a valuation for the vehicle;
receive, from the server device, the valuation for the vehicle based on the one or more determined values for the vehicle and based on the request;
create a vehicle profile for the vehicle based on the video data, the vehicle history report, the feature data, the one or more determined values for the vehicle, and the valuation for the vehicle; and
perform one or more actions based on the vehicle profile.

9. The device of claim 8, wherein the one or more processors are further configured to:
receive one or more offers for the vehicle based on the vehicle profile;
provide, to the user device, information identifying the one or more offers for the vehicle;
receive, from the user device, a selection of a particular offer from the one or more offers,
wherein the particular offer is associated with a particular consumer; and
connect, based on the selection, the user device with a user device associated with the particular consumer.

10. The device of claim 8, wherein the one or more processors, when processing the video data, the vehicle history report, and the feature data, with the machine learning model, to determine the one or more values for the vehicle, are configured to:
process video data identifying an exterior of the vehicle, with a first machine learning model, to determine the exterior condition of the vehicle;
process video data identifying an interior of the vehicle, with a second machine learning model, to determine the interior condition of the vehicle;
process feature data identifying features of the vehicle, with a third machine learning model, to determine working features of the vehicle;
process the feature data identifying the audio of the operating engine of the vehicle, with a fourth machine learning model, to determine an operating condition of an engine of the vehicle;

process feature data identifying the tires of the vehicle, with a fifth machine learning model, to determine the treadwear of the tires of the vehicle; and determine the one or more values for the vehicle based on the exterior condition of the vehicle, the interior condition of the vehicle, the working features of the vehicle, the operating condition of the engine of the vehicle, and the treadwear of the tires of the vehicle.

11. The device of claim 8, wherein the one or more processors are further configured to:
receive the historical video data associated with the plurality of vehicles;
receive historical vehicle history reports of the plurality of vehicles;
receive the historical feature data associated with the plurality of vehicles; and
train the machine learning model, with the historical video data, the historical vehicle history reports, and the historical feature data, to generate a trained machine learning model.

12. The device of claim 8, wherein the one or more processors are further configured to: receive the vehicle identification number of the vehicle via the video data; and perform optical character recognition on the video data to identify the vehicle identification number in the video data.

13. The device of claim 8, wherein the one or more processors are further configured to: receive the machine learning model from another device, wherein the machine learning model is trained by the other device based on the historical video data, the historical vehicle history reports, and the historical feature data, wherein the historical feature data identifies: historical working features of the plurality of vehicles.

14. The device of claim 8, wherein the one or more processors are further configured to:
receive, from the user device, a request for a valuation application to be installed on the user device; and
provide the valuation application to the user device based on the request,
wherein the valuation application causes the user device to capture and provide the video data and the feature data to the device.

15. A non-transitory computer-readable medium storing instructions, the instructions comprising:
one or more instructions that, when executed by one or more processors, cause the one or more processors to:
receive, from a user device, video data associated with a vehicle,
wherein the video data identifies one or more of:
an exterior condition of the vehicle, or
an interior condition of the vehicle;
receive a vehicle history report of the vehicle based on a vehicle identification number of the vehicle;
receive, from the user device, feature data associated with the vehicle,
wherein the feature data identifies one or more of:
audio of an operating engine of the vehicle, or
treadwear of tires of the vehicle;
process the video data, the vehicle history report, and the feature data, with a machine learning model, to determine one or more values for the vehicle,
wherein the machine learning model is trained based on historical video data, historical vehicle history reports, and historical feature data,
wherein the historical video data identifies:
historical exterior conditions of a plurality of vehicles, and
historical interior conditions of the plurality of vehicles,
wherein the historical vehicle history reports are associated with the plurality of vehicles, and
wherein the historical feature data identifies:
historical audio of operating engines of the plurality of vehicles, and
historical treadwear of tires of the plurality of vehicles;
determine a valuation for the vehicle based on the one or more determined values for the vehicle; and
perform one or more actions based on the valuation for the vehicle,
wherein the one or more actions include one or more of:
providing the valuation for the vehicle to a plurality of dealerships that provide offers for the vehicle based on the valuation for the vehicle,
providing the valuation for the vehicle to a consumer lending platform that calculates terms for a new vehicle based on the valuation for the vehicle, or
providing the valuation for the vehicle to a plurality of consumers that provide offers for the vehicle based on the valuation for the vehicle.

16. The non-transitory computer-readable medium of claim 15, wherein the instructions further comprise:
one or more instructions that, when executed by the one or more processors, cause the one or more processors to:
identify, based on the valuation for the vehicle, one or more of:
offers for the vehicle,
trade-in reductions for the vehicle,
a new vehicle for which to trade in the vehicle, or
financing for the new vehicle; and
provide, to the user device, information identifying the one or more of:
the offers for the vehicle,
the trade-in reductions for the vehicle,
the new vehicle for which to trade in the vehicle, or
the financing for the new vehicle.

17. The non-transitory computer-readable medium of claim 15, wherein the instructions further comprise:
one or more instructions that, when executed by the one or more processors, cause the one or more processors to:
receive one or more offers for the vehicle based on the valuation for the vehicle;
provide, to the user device, information identifying the one or more offers for the vehicle;
receive, from the user device, a selection of a particular offer from the one or more offers,
wherein the particular offer is associated with a particular dealership; and
connect, based on the selection, the user device with a user device associated with the particular dealership.

18. The non-transitory computer-readable medium of claim 15, wherein the instructions further comprise:
one or more instructions that, when executed by the one or more processors, cause the one or more processors to:
receive one or more terms for one or more new vehicles based on the valuation for the vehicle;
provide, to the user device, information identifying the one or more terms for the one or more new vehicles;

receive, from the user device, a selection of a particular new vehicle from the one or more new vehicles,
wherein the particular new vehicle is associated with a particular consumer lending platform; and connect, based on the selection, the user device with the particular consumer lending platform.

19. The non-transitory computer-readable medium of claim 15, wherein the instructions further comprise:
one or more instructions that, when executed by the one or more processors, cause the one or more processors to:
receive one or more offers for the vehicle based on the valuation for the vehicle;
provide, to the user device, information identifying the one or more offers for the vehicle;
receive, from the user device, a selection of a particular offer from the one or more offers,
wherein the particular offer is associated with a particular consumer; and
connect, based on the selection, the user device with a user device associated with the particular consumer.

20. The non-transitory computer-readable medium of claim 15, wherein the one or more instructions, that cause the one or more processors to process the video data, the vehicle history report, and the feature data, with the machine learning model, to determine the one or more values for the vehicle, cause the one or more processors to:
process video data identifying an exterior of the vehicle, with a first machine learning model, to determine the exterior condition of the vehicle;
process video data identifying an interior of the vehicle, with a second machine learning model, to determine the interior condition of the vehicle;
process feature data identifying features of the vehicle, with a third machine learning model, to determine working features of the vehicle;
process the feature data identifying the audio of the operating engine of the vehicle, with a fourth machine learning model, to determine an operating condition of an engine of the vehicle;
process feature data identifying the tires of the vehicle, with a fifth machine learning model, to determine the treadwear of the tires of the vehicle; and
determine the one or more values for the vehicle based on the exterior condition of the vehicle, the interior condition of the vehicle, the working features of the vehicle, the operating condition of the engine of the vehicle, and the treadwear of the tires of the vehicle.

\* \* \* \* \*